United States Patent [19]

Gower

[11] 3,849,997

[45] Nov. 26, 1974

[54] SUBMARINE PIPELINES

[75] Inventor: Gordon Shields Gower, French's Forest, New South Wales, Australia

[73] Assignee: Nabalco Engineering Pty. Ltd., New South Wales, Australia

[22] Filed: May 25, 1973

[21] Appl. No.: 363,969

[30] Foreign Application Priority Data
May 29, 1972 Australia............................ 9126/72

[52] U.S. Cl................................. 61/72.3, 114/206
[51] Int. Cl.............................................. F16l 1/00
[58] Field of Search ......... 61/72.3, 72.1, 72.4, 46.5; 114/206

[56] References Cited
UNITED STATES PATENTS
3,466,881   9/1969   Lamy.................................. 61/72.3
3,616,651   11/1971  Chang et al......................... 61/72.3
3,644,695   2/1972   Shuey et al. .................... 61/72.3 X FOREIGN PATENTS OR APPLICATIONS
1,167,757   6/1968   Great Britain...................... 61/72.3

Primary Examiner—Jacob Shapiro
Attorney, Agent, or Firm—Kane, Dalsimer, Kane, Sullivan and Kurucz

[57] ABSTRACT

A submarine pipeline formed from lengths of pipe joined together in end to end relationship on shore. The pipeline has an overall positive buoyancy and is propelled seawards from the shore as a continuous length for laying in a desired location relative to the sea bed. The pipeline includes variable buoyancy supporting structure including at least one buoyancy chamber connected to the barge and connected to the leading end of the pipeline. The supporting structure permits anchors progressively applied to the supporting structure to be progressively anchored to the sea bed according to the contour of the sea bed by varying the buoyancy of the support structure by operation of controls located on the barge. The pipeline progressively engages the anchors and maintains itself clear of the sea bed by virtue of its buoyancy. The anchors impart a negative buoyancy to the pipeline to locate the pipeline relative to the sea bed and each anchor includes an anchor weight and rollers spaced above the anchor weight. The rollers engage the pipeline whereby the pipeline can be propelled seawards past the applied anchors. The controls comprise controls for the buoyancy chamber arranged to selectively vary the degree of buoyancy of the chamber. Finally, a propellant is located on the shore and is connected to the pipeline to provide a continuous thrust against the supporting structure to move the supporting structure and the pipeline seawards.

10 Claims, 16 Drawing Figures

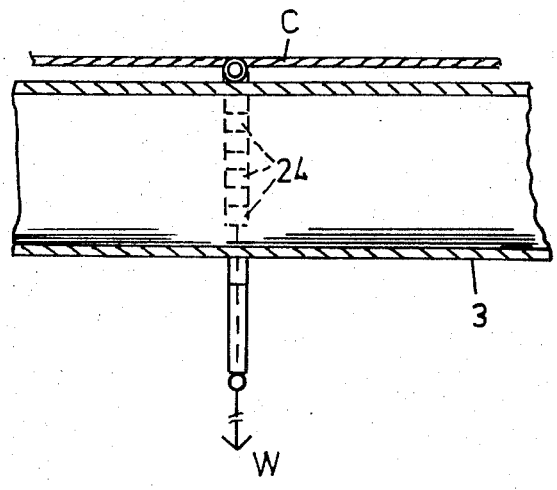
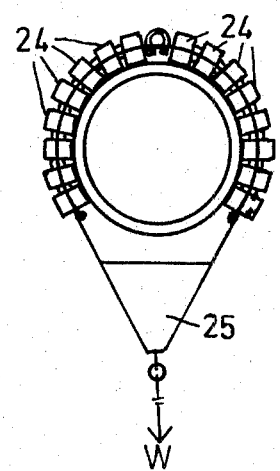
FIG. 8.  FIG. 8A.
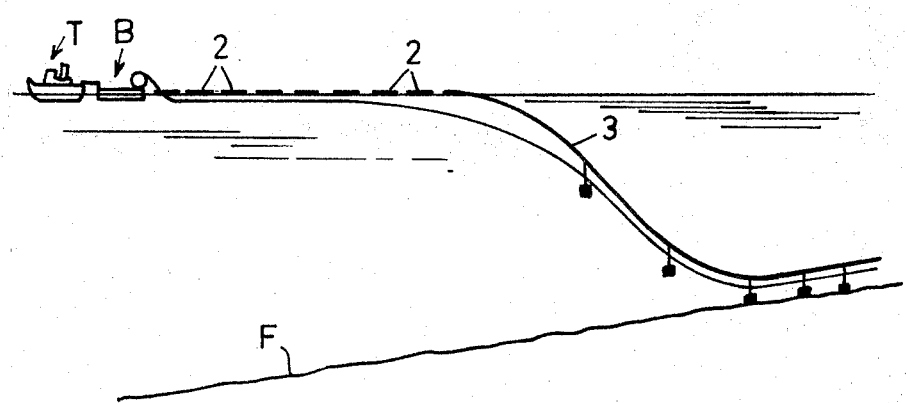
FIG. 5.

3,849,997

SUBMARINE PIPELINES

This invention relates to submarine pipelines and has been devised to provide improvements in the preparation, assembly and laying of such pipelines.

Known techniques for the design, assembly and laying of such pipelines (referred to for simplicity hereafter as the pipeline) will be briefly described hereunder, and in such known techniques the pipeline has overall negative buoyancy once it becomes operational. When the pipeline is to convey gas, the negative buoyancy is usually achieved by encasing it with concrete.

The known techniques are summarised as follows:

a. Individual pipes are joined together on shore, given negative buoyancy and are then pulled into position along the sea or river bed (or in a previously excavated trench) where the completed pipeline finally rests. This method is generally limited to comparatively short lengths of pipeline, say up to 10 miles.

b. Individual pipes are joined together ashore to form strings of say ½ mile in length, made buoyant and floated into position. This string is then joined together with the end of the previous string, usually on the surface. The buoyancy is then removed allowing the pipeline to sink into its final position. This method requires calm surface conditions and requires use of divers to release the buoyancy according to a predetermined programme. Consequently, there are depth restrictions on this method.

c. Individual pipes are attached to the seaward end of the pipeline. This work is carried out from a lay barge, and as lengths are added, the lay barge is moved forward as the pipeline is lowered to the sea bed. Difficulties occur with this method when weather conditions deteriorate, but this method is the one usually adopted in open sea. It is considered that this method can only be used to a limited depth.

d. Individual pipes are joined together ashore and wound onto a reel located on the lay barge. The barge is towed to the location where the pipeline is unwound along the route. This method has not yet been used for pipes over about 10 inch diameter due to the limiting allowable radius of curvature.

In all cases (except (a)) during the course of laying the pipeline is subject to bending which is an inherent disadvantage. In all cases the pipeline is laid under tension to alleviate the possibility of buckling due to bending.

In all of the above procedures, forces to either control the pipe laying procedure, or to cause movement, are applied by means of winches held either on the barge or on land.

According to the present invention, the pipeline is formed from lengths of pipe joined together in end to end relationship on shore, said pipeline having an overall positive buoyancy and being propelled seawards from the shore as a continuous length for laying in a desired location relative to the sea bed; said pipeline including variable buoyancy pipeline supporting means including at least one buoyancy chamber connected to the barge and connected to the leading end of the pipeline, said supporting means providing a means whereby anchors progressively applied to the supporting means are progressively anchored to the sea bed according to the contour of said sea bed by varying the buoyancy of said supporting means by operation of control means located on the barge, said pipeline progressively engaging the anchors and maintaining itself clear of said sea bed by virtue of its buoyancy; the anchors imparting a negative buoyancy to the pipeline to locate said pipeline relative to the sea bed and each including an anchor weight and rollers spaced above said anchor weight, said rollers engaging said pipeline whereby the latter can be propelled seawards past the applied anchor weights; said control means comprising controls for said buoyancy chamber (s) arranged to selectively vary the degree of buoyancy of said chamber (s); and propelling means located on shore and connected to the pipeline to provide a continuous thrust against the supporting means to move said supporting means and the pipeline seawards.

The invention will now be described with reference to the annexed drawings, wherein:

FIGS. 1–5 are diagrammatic views depicting the movement of a pipeline and supporting means therefor seawards from the shore, and the application of anchors to said supporting means and to the sea bed, for subsequent engagement by the pipeline to locate it relative to the sea bed.

FIGS. 8, 8A, 9, 10 and 10A are detail views of various forms of anchors for the pipeline.

Figure 1:
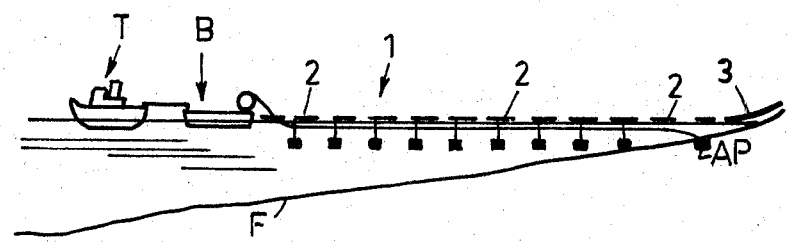
Figure 2:
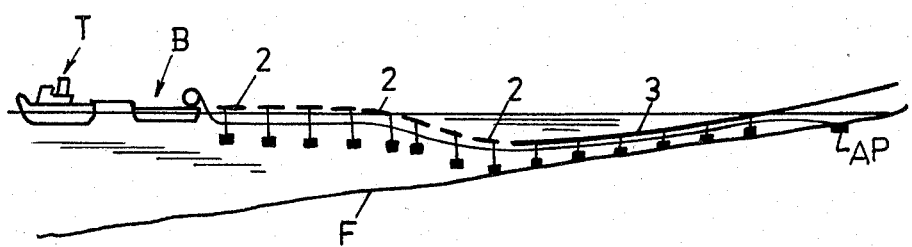
Figure 3:
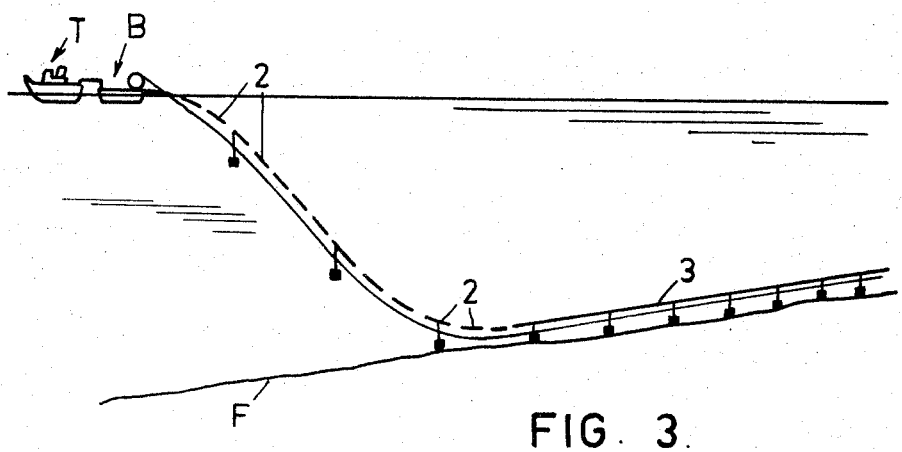
Figure 4:
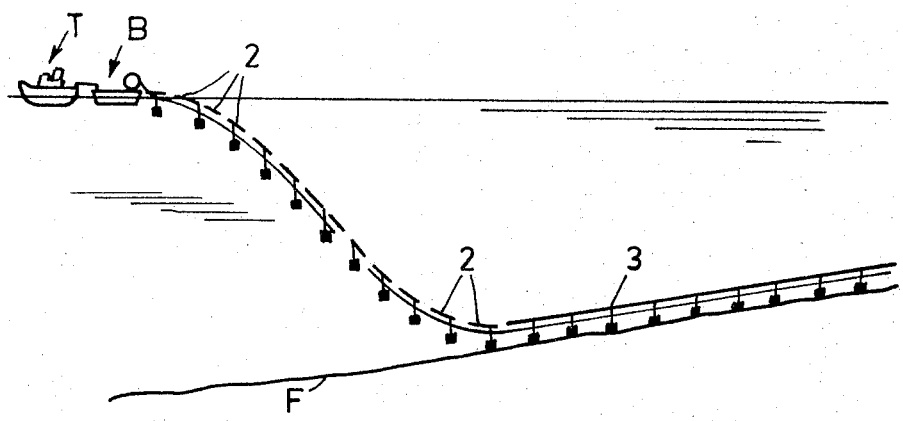
Figure 6:
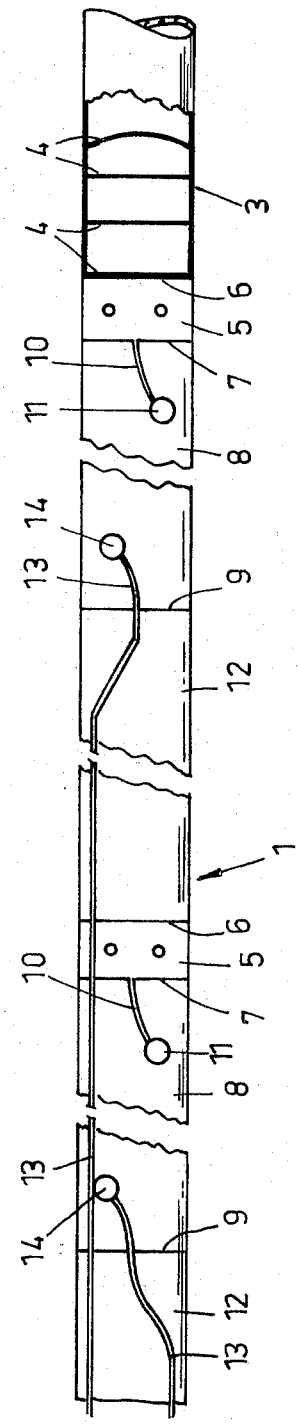
FIG. 6 is a fragmentary detail view of one form of the supporting means for the pipeline, sealed at one end to the leading end of the pipeline.

In the illustrated embodiments, the pipeline supporting means are referred to as comprising a plurality of conjoined buoyancy chambers and reference is also made to the use of pressurised air for the control means and for propelling the pipeline seawards. The invention is not limited to these embodiments for the following reasons:

a. the pipeline supporting means is presently illustrated to show that these supporting means can adopt various "bent" shapes for the purpose of applying the anchors in desired positions along the proposed path of the pipeline, regardless of the sea bed contour, b. the invention is not restricted to the use or pressurised air as other pressure fluids may be substituted.

As illustrated, the supporting means, generally indicated by reference 1, comprises a plurality of pipes generally indicated at 2 connected together and to a pipeline 3. The pipeline 3 must have a positive buoyancy. The degree of buoyancy is controlled for example by encasing the pipeline on shore with concrete. The number of connected pipes 2 required, is a function of the greatest depth of water in which the pipeline 3 is to be laid and the allowable stresses in chamber walls to be described. The tail end of the supporting means 1 is secured to the pipeline 3 to seal that end of supporting means 1 and pipeline 3. This includes at least one and may be a plurality of bulkheads 4 which are shaped and spaced as desired, to provide an effective seal between the respective ends of supporting means 1 and pipeline 3. If one bulkhead 4 fractures or otherwise fails, the remainder function as back-up bulkheads to ensure an effective seal. As illustrated, each supporting means pipe section 2 includes a variable buoyancy units comprising a water compartment 5 having openings therein; a first bulkhead 6 on one end of the compartment; a second bulkhead 7 sealing the other end of the water compartment 5 from one end of an air-water compartment 8; and a third bulkhead 9 sealing the other end of the air-water compartment 8. A flexible water pipe 10 having a weight 11 thereon is located in the air-water compartment 8 and is mounted in a port in the bulkhead 7 for communication with the water compartment 5. A flexible airpipe 13 having a float 14 thereon is also located in the air-water compartment 8. It is mounted in a port in the bulkhead 9 and the airpipe 13 is connected through control means to be described, to a source of pressurised air supply, both of which latter are carried by a barge B. The supporting means 1 of the illustrated embodiment also includes a plurality of airtight compartments 12 consisting of pipe sections located between bulkheads 6 and 9 of the buoyancy units described, 5 and buoyancy units being, hereafter referred to as buoyancy chambers. A separate air pipe 13 is connected to each compartment 8 so that by either increasing or decreasing the air pressure within each compartment 8 the buoyancy may be varied for the individual buoyancy chambers along the length of the supporting means 1, thus varying its shape. Thus it is possible to reproduce at a controlling station, i.e., on the barge B, the shape required in the supporting means 1. The shape of the supporting means 1 is varied as required throughout its length in accordance with the general trend of the ocean floor F without regard to the actual contour of the ocean floor. This is achieved by metering at the controlling station on barge B, the pressure existing within each variable buoyancy chamber and adjusting the buoyancy of each said chamber 2.

Sealed manometer tubes 16 are connected one to each compartment 8 and each registers on a depth gauge 17. A pressurised air supply 18 is connected through pressure regulator 19 and valves 20 to atmosphere and through said regulator 19 and valves 21 to the individual manometer tubes 16 via lines 22, and to the compartments 8 through lines 23. This control means is located on barge B and with it, it is possible to determine the exact depth position of any part of the supporting means 1, and it is also possible for these results to be interpreted in order to give the operator the necessary instructions to alter the shape of the supporting means 1 to that desired to provide a safeguard against overstressing.

The anchors constitute mooring points for the pipeline 3 and they may take various forms. In each case they each include rollers 24 supported by a yoke 25 which in turn carries an anchor block-weight W. The rollers 24 are located above the weight W and they engage the pipeline substantially above the horizontal centre of said pipeline and the pipeline moves freely past the rollers. The weight W may be flexibly or rigidly connected to the yoke 25 and if flexibly connected, the distance between yoke 25 and anchor block W is predetermined from sea bed profile, and the yokes 25 are located in position relative to the shore by mooring cable C having one end fixed on or adjacent the shore as indicated at AP and being reeled from a reel 26 carried by barge B.

Where it is preferred to encase the pipeline 3 with concrete for example, the encasement is applied onshore in order to accurately attain the desired degree of buoyancy in the pipeline 3. The supporting means 1 are fabricated on shore and launched and the seaward end thereof is flexibly connected to barge B. The barge B is the headquarters of the off-shore operations and locates the pipeline 3 throughout the procedure. The position of the barge B is predetermined by radio for example, and in order for it to keep position it is assisted for example by tug T. A mooring cable C as stated, is anchored on or adjacent the shore and is reeled from the barge B. The supporting means 1 and later the pipeline 3 and barge B move forward, the mooring cable C is unreeled under tension and at predetermined positions anchors are attached to it and threaded on to the supporting means.

As the pipeline is moved forward it passes through the anchors, which have already been located in position by the supporting means and fixed in position by the mooring line. Further anchors are located at predetermined intervals for subsequent engagement by the pipeline 3.

The buoyancy of the supporting means 1 is greater than the anchors, but the anchors when secured to the pipeline 3, overcome the buoyancy of the pipeline 3. Therefore as the pipeline 3 progresses it is necessary to pump a quantity of water into the supporting means 1 to apply to it a desired curvature for locating the anchors. Thus the pipeline is not subject to excessive bending and sudden changes of direction as in the known techniques. The rollers 24 allow the pipeline 3 to move through the anchors and the pipeline 3 is held in its desired position. This technique is followed until approaching an offshore structure, with more water being added to the supporting means 1 as required to allow for the increasing depth. The thrust moving the pipeline 3 seawards is always at the offshore end of the pipeline 3 keeping the pipeline 3 under tension and also substantially all severe bending is imparted to the supporting means 1 during the laying procedure. As the offshore structure is approached the spacing of the anchors is increased, and to partially counteract this more water is added to the supporting means 1.

When the end of the pipeline 3 has reached its designed location the pressure within the pipeline is released and the water within the supporting means 1 is pumped out causing the supporting means to float.

The anchorage along the last part of the pipeline 3 is inadequate to balance this buoyancy such that the pipeline 3 is brought to the surface where it may be secured either to the offshore structure if completed, or to barge B.

The supporting means 1 is now disconnected, and a riser (not shown) is connected to the end of the pipeline 3 and extra anchors are added. The pipeline 3 is then allowed to sink to the sea bed F as the riser is extended. Concrete is then placed around the end of the pipeline 3 to form the necessary operational thrust block.

The following procedure is adopted in order to obtain the pressure within the pipeline 3 which exerts the thrust to cause movement seawards.

The first length 27 of pipeline 3 is drawn over a cup-washer type piston 28 which allows for irregularities in the bore of the pipe. The piston 28 is held in position by a hollow tube 29 running through the pipe 27 to a stop 30. The leading end of the first pipe length 27 is secured to the trailing end of the supporting means 1 and this securement includes the bulkhead (s) 4 previously described. Pressure within the pipeline 3 is obtained by compressing air, gas or some other fluid, and is pumped by pump 31 to the pipeline 3 through the tube 29 and piston 28 to the bulkhead (s) 4, which takes the thrust from the piston 28 back to the stop 30. Since there is a considerable thrust in this tube 29 it is preferably supported at regular intervals by spiders (not shown) located within the pipeline 3.

Figure 12:
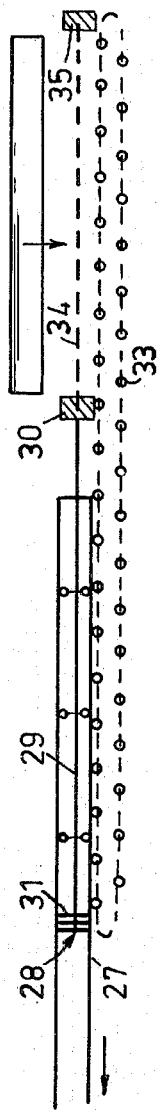
FIG. 12 is a diagrammatic view of the arrangements for welding a new pipe length to the trailing end of the last pipe length of the pipeline, and the arrangement for propelling the pipeline seawards.
Figure 7:
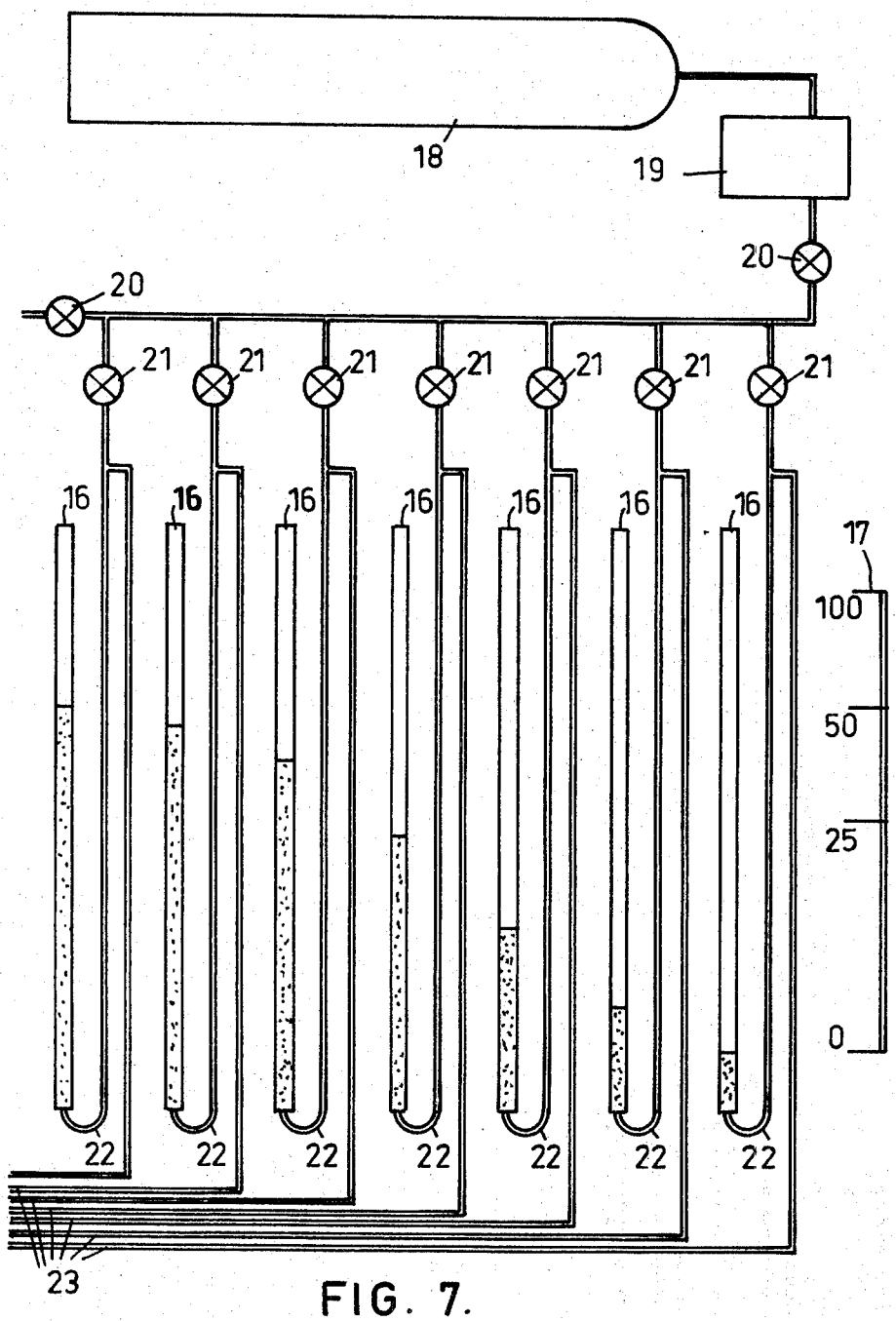
FIG. 7 is a detail view of one from of the control means for the pipeline supporting means.
Figure 9:
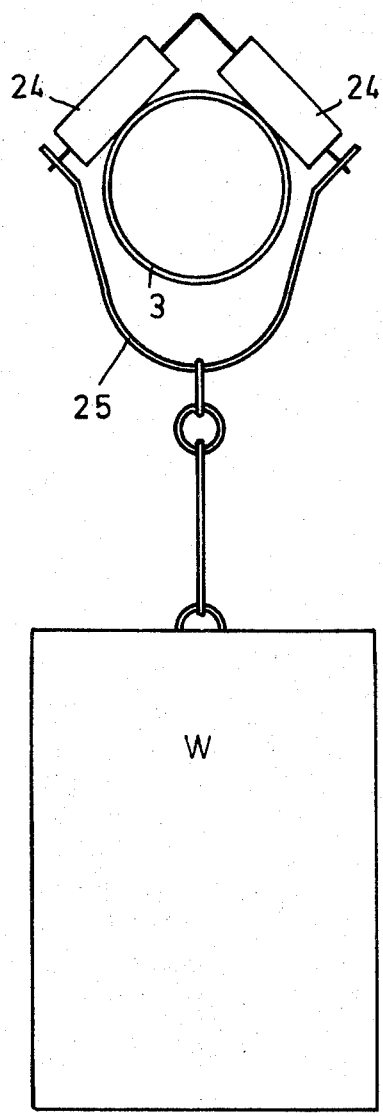
Figure 10A:
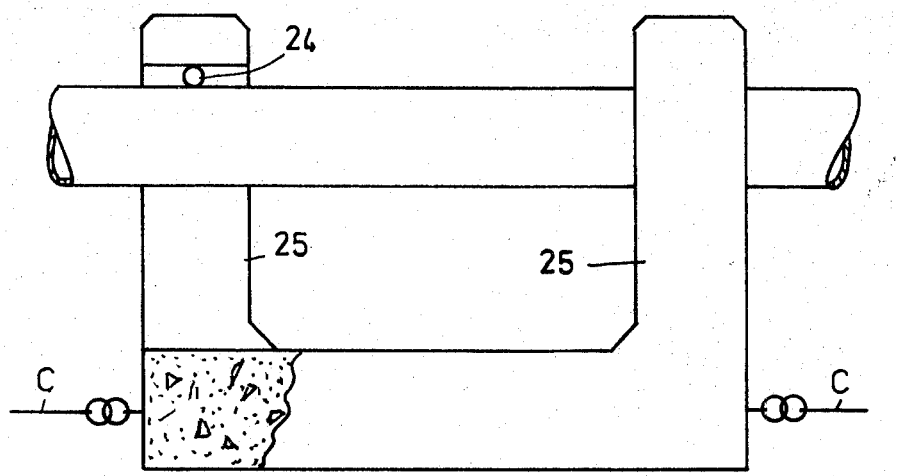
Figure 10:
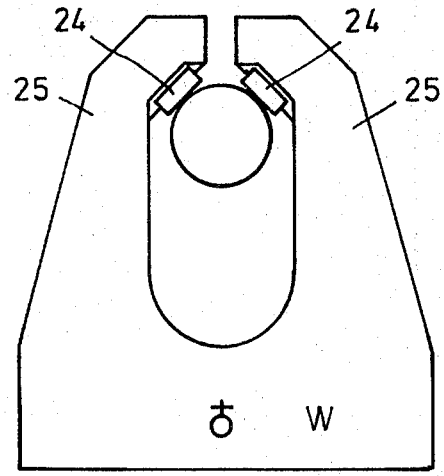
Figure 11:
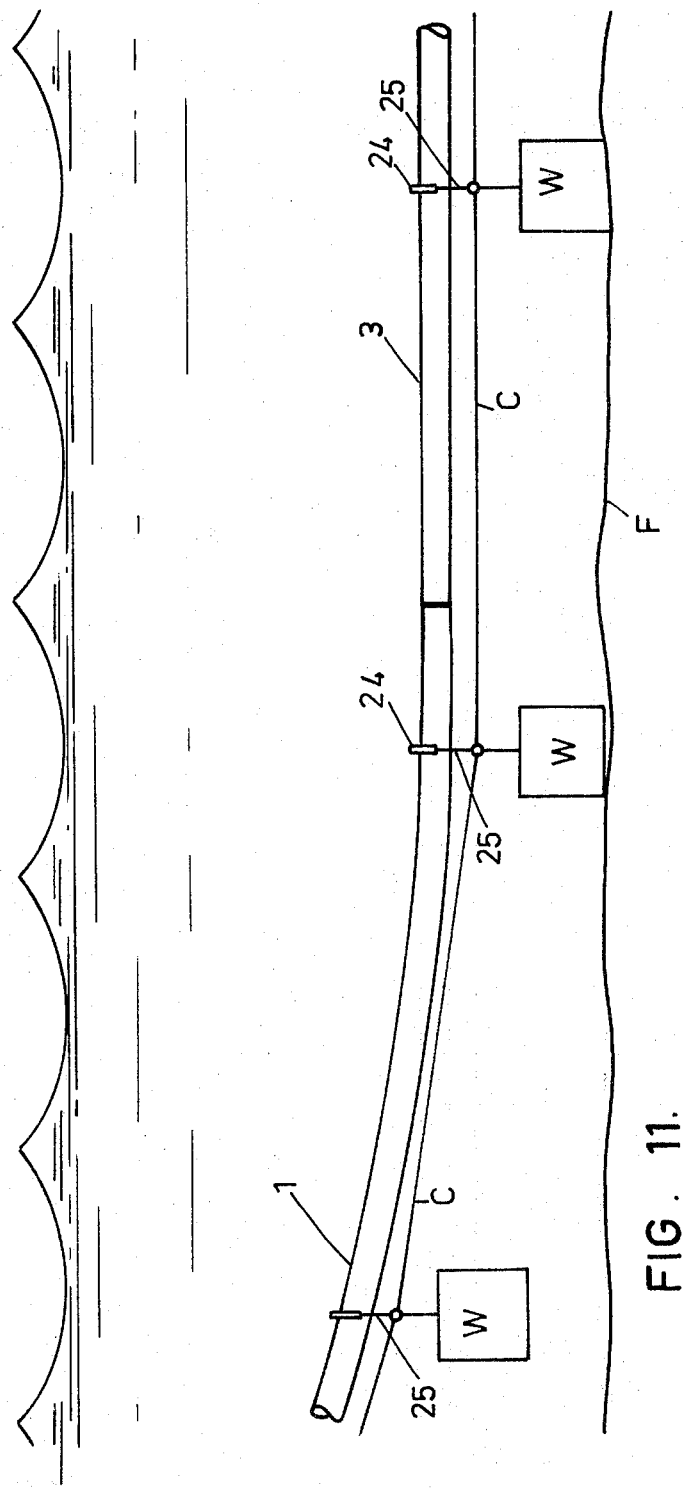
FIG. 11 is a detail view of the application of anchor weights to the pipeline.
Figure 13:
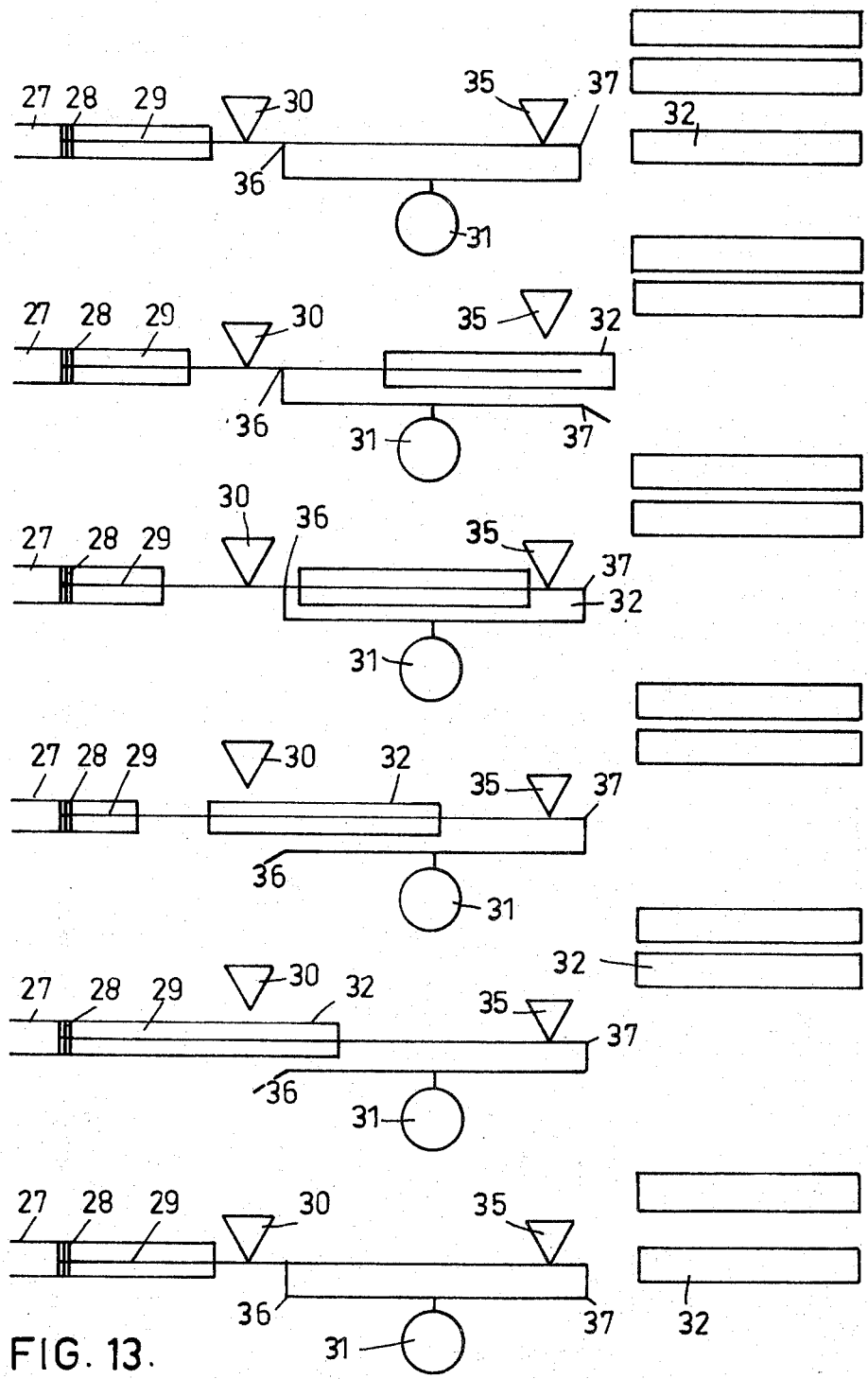
FIGS. 13–14 are further views of the pipe welding and propelling means illustrated in FIG. 12.
Figure 14:
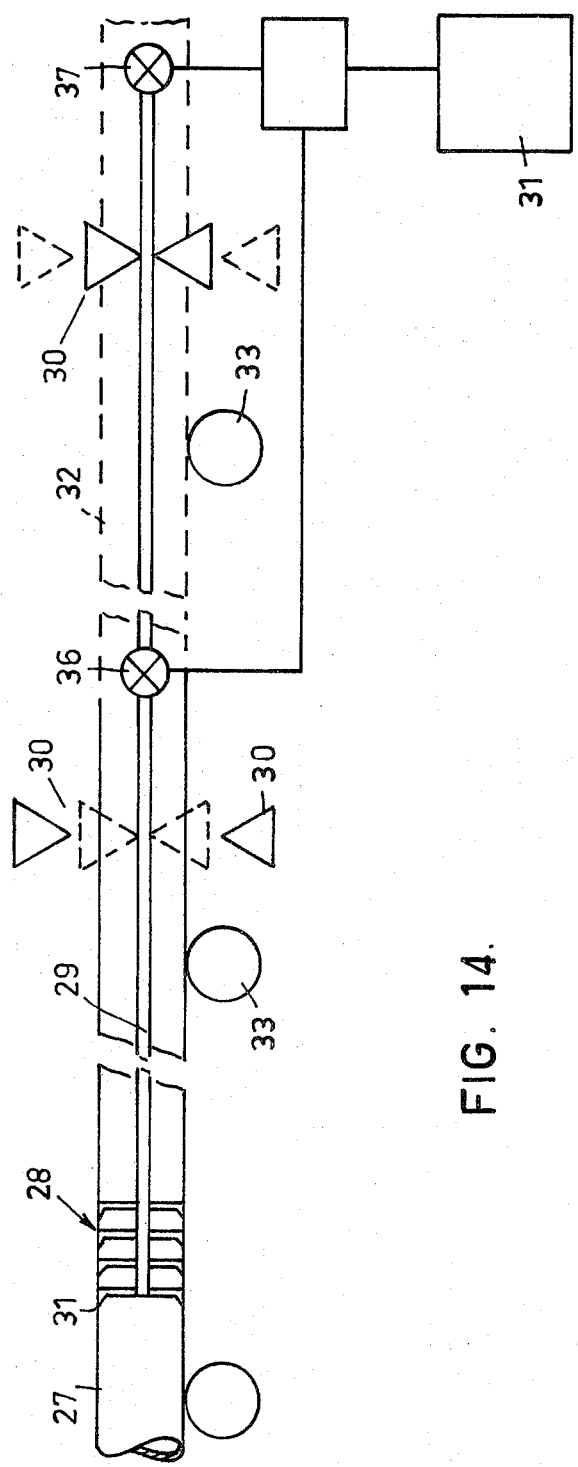

While welding and x-ray procedures are progressing, see FIG. 12, the next length 32 of pipeline is put on to a conveyor 33 behind stop 30. An extension 34 of the tube 29 is inserted within this subsequent length 32 and attached to the tube 29 within the original length 27. The thrust is then taken up by this extended tube 34 and stop 30 is then removed. This allows the second length 32 of pipe to move up to the original length 27. When the second length 32 of pipe has passed stop 30, the stop 30 is replaced by stop 35 and the thrust again taken by this stop 35 while the tube extension 34 is removed. By means of two hose connection points 36-37 continuous pressure can be applied to the pipeline 3. This procedure is repeated until the full length of pipeline 3 is constructed.

The advantages of the invention are that most of the work involved in laying the pipeline are shorebased and not subject to vagaries of the weather. The offshore laying barge B requires no anchoring facilities and the barge is free to move relative to the pipeline 3 and should the weather deteriorate during the laying procedure, then it is possible for tugs and barges to run for shelter and the supporting means 1 to be released and then recovered when the pipe laying recommences.

Also it will be understood that the supporting means 1 may perform functions other than those described here with regard to the actual laying of a pipeline 3. For example, these means 1 may be used to raise a pipeline 3 or to lower and position it, and the precise constructional features thereof may be varied to suit other requirements.

I claim:

1. A submarine pipeline comprising:
   lengths of pipe preassembled on shore in end-to-end relationship;
   the pipeline having an overall positive buoyancy and having been propelled seaward from the shore as a continuous length for laying in a desired location relative to the sea bed;
   variable buoyancy pipeline support means on the pipeline including at least one buoyancy chamber having been connected to a barge and connected to the leading edge of the pipeline prior to positioning of the pipeline in relation to the sea bed;
   anchors on the support means and anchored to the sea bed according to the contour of the sea bed having been progressively applied thereto through the use of control means located on the barge for varying the buoyancy of the support means;
   the pipeline progressively in engagement with of its buoyancy;
   the anchors imparting a negative buoyancy to the pipeline to locate the pipeline relative to the sea bed;
   each anchor including an anchor weight and rollers spaced above the anchor weight;
   the rollers engaging the pipeline whereby the latter can be propelled seawards past the applied anchors;
   each buoyancy chamber adapted to have its degree of buoyancy selectively varied for interconnection with controls of the control means; and
   the pipeline having been moved seaward through the provision of a continuous thrust against the supporting means by propelling means located on shore and connected to the pipeline.

2. A submarine pipeline in accordance with claim 1, wherein the buoyancy chamber adapted for use in forming the pipeline includes a water compartment having openings therein, a sealed air-water compartment, a first bulkhead on one end of the water compartment, a second bulkhead sealing the other end of the water compartment from one end of the air-water compartment, a third bulkhead sealing the other end of the air-water compartment, a water pipe located in the air-water compartment and mounted in a port in the first bulkhead, the water pipe communicating with the water compartment, an air pipe connected at one end through the control means to a source of pressurized air supply on the barge and having its other end projecting through a port in the third bulkhead to the air-water compartment, the control means adapted for use in forming the pipeline including depth indicating means for the buoyancy chamber whereby the depth position of the buoyancy chamber relative to the sea bed is known and can be varied by pumping air into or exhausting air from the air-water compartment.

3. A submarine pipeline in accordance with claim 1, wherein a plurality of the buoyancy chambers are secured in end-to-end relationship to pipe lengths forming individual airtight compartments, the airtight compartments being located between one end of a said air-water compartment of one said buoyancy chamber and one end of the water chamber of the next said buoyancy chamber, each said air-water compartment having an air tube and a water tube projecting thereinto.

4. A submarine pipeline in accordance with claim 1, wherein the control means utilized for forming the pipeline includes a sealed manometer tube for each buoyancy chamber and a depth gauge therefor, and wherein the pressurized air supply is connected through a pressure regulator and control valves to atmosphere, and through said pressure regulator and control valves to each said manometer tube and to said buoyancy chamber.

5. A submarine pipeline in accordance with claim 1, wherein the anchors each comprise a yoke having the rollers mounted thereon, said rollers engaging the pipeline substantially above the horizontal centerline of the pipeline, the yoke supporting an anchor weight at a desired depth therefrom, the anchors each being connected to a mooring cable fixed at one end on shore and adapted to be reeled from a barge.

6. A submarine pipeline in accordance with claim 1, wherein the pipeline propelling means adapted for use in forming the pipeline includes a piston mounted in the last on-shore pipe length of the pipeline and a first tube connected at one end to and through the piston and having its other free end projecting out of said last pipe length, a second tube connectable to the free end of the first tube, a pair of spaced-apart stops, a conveyor for at least said last pipe length of the pipeline and for a new pipe to be joined to the last pipe length, and a source of pressurized air supply selectively connectable to the tubes.

7. A method of forming and laying a submarine pipeline as a continuous operation, said method comprising the steps:
   joining lengths of pipe on-shore in end-to-end relationship and securing variable buoyancy pipe supporting means to the leading end of the leading pipe length;
   connecting said pipe supporting means to depth control means supported on a barge located off shore;
   varying the depth of the pipe supporting means by the control means and progressively applying anchors to said pipe supporting means;
   applying said anchors progressively to the sea bed in desired spaced relationship by a cable fixed at one end on-shore and wound from a reel on the barge;
   propelling the pipe supporting means and the pipeline seawards by propelling means located onshore, said pipeline progressively engaging the applied anchors independent of any vertical movement of the barge due to the effect of waves or swell.

8. A method of forming and laying a submarine pipeline as a continuous operation, said method comprising the steps:
   joining lengths of pipe on shore in end to end relationship and securing variable buoyancy pipe supporting means to the leading end of the leading pipe length;
   connecting said pipe supporting means to depth control means supporting on a barge located off shore;
   varying the depth of the pipe supporting means by the control means and progressively applying anchors to said pipe supporting means;
   applying said anchors progressively to the sea bed in desired spaced relationship by a cable fixed at one end on shore and wound from a reel on the barge.
   propelling the pipe supporting means and the pipeline seawards by propelling means located onshore, said pipeline progressively engaging the applied anchors.

9. A method of forming and laying a submarine pipeline as claimed in claim 8, including the steps:
   welding a new pipe length to the end of the last pipe length of the formed pipeline;
   X-raying said weld;
   cutting out said weld if faulty and re-welding the pipe lengths;
   X-raying the re-weld;
   encasing the formed pipeline prior to said pipeline passing from the shore.

10. A method of forming and laying a submarine pipeline as claimed in claim 9, including the step:
    regulating the speed of the moving pipeline to perform any of said operations claimed in claim 9.

* * * * *